United States Patent
Pietrowski et al.

(10) Patent No.: US 6,431,136 B2
(45) Date of Patent: Aug. 13, 2002

(54) INTAKE DEVICE WITH RAM PIPES AND LONGITUDINALLY ADJUSTABLE RESONANCE PIPES

(75) Inventors: Herbert Pietrowski, Pleidelsheim; Werner Wagner, Ludwigsburg; Stephan Wild, Sulzfeld, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/813,642

(22) Filed: Mar. 22, 2001

(30) Foreign Application Priority Data

Mar. 22, 2000 (DE) .......................................... 100 14 282

(51) Int. Cl.[7] .......................... F02M 35/10; F02B 27/02
(52) U.S. Cl. ............................... 123/184.59; 123/184.53
(58) Field of Search ...................... 123/184.59, 184.57, 123/184.49, 184.53

(56) References Cited

FOREIGN PATENT DOCUMENTS

| DE | 38 43 690 | 7/1990 |
|---|---|---|
| DE | 39 40 486 | 6/1991 |
| DE | 198 00 063 | 7/1999 |
| EP | 0 255 059 | 7/1987 |
| EP | 0 980 968 | 8/1998 |

*Primary Examiner*—Tony M. Argenbright
*Assistant Examiner*—Katrina B. Harris
(74) *Attorney, Agent, or Firm*—Crowell & Moring LLP

(57) ABSTRACT

An air intake system with resonance as well as ram charging. Ram charging is effected via intake ducts 15 and ram manifold 13, whereas resonance charging is effected by longitudinally adjustable resonance channels 12 and resonance manifold 11. The longitudinal adjustment of the resonance channels 12 is effected by rotatable control elements 22 driven by a motor 27, and the control elements 22 are accommodated in control housings 20 which communicate with the ram manifolds 13 via connecting ducts 34. The use of connecting ducts 34 allows a largely flexible arrangement of the control housings in relation to the intake manifold of the internal combustion engine. As a result the system can be advantageously and optimally adapted to the spatial characteristics within the engine compartment of a motor vehicle.

10 Claims, 3 Drawing Sheets

INTAKE DEVICE WITH RAM PIPES AND LONGITUDINALLY ADJUSTABLE RESONANCE PIPES

BACKGROUND OF THE INVENTION

The invention relates to an air intake device, particularly an intake manifold for an internal combustion engine, having a ram manifold with intake ducts as ram pipes to utilize ram charging effects and longitudinally adjustable resonance channels and a resonance manifold to utilize resonance charging effects. The invention further relates to a control housing for accommodating the longitudinally adjustable resonance pipes.

The use of the described effects of resonance and ram charging is known and is simultaneously implemented in an air intake device described in published German Patent Application No. DE 39 40 486 A1. The function of such an air intake device can, for example, be discerned based on FIG. 2 of said document. The resonance manifold is accommodated in a hollow cylinder 22 and provided with an inlet for the combustion air. Via orifices 8a, 8b the air reaches a resonance channel 8 that is longitudinally adjustable by rotating the cylinder 22. The resonance channel opens out into a ram manifold 6 through which the combustion air reaches intake ports 2, which open out through a cylinder head flange 4 for connection with the internal combustion engine. Arranged parallel to the ram manifold 6 is a ram manifold 7, which operates analogously to ram manifold 6. The two ram manifolds are interconnected in a manner not shown via a port that can be closed by a resonance valve. When the resonance valve is closed, the effect of resonance charging the internal combustion engine with combustion air is used, whereas when the flap is open the ram charging effect is used.

This technical solution disclosed for the intake manifold of this German patent document is very compact in its design in that the housing areas of the resonance channels and the intake manifold comprising the ram manifolds 6, 7 and the intake ducts 2, 3 are nested within one another. The entire air intake device, due to the required minimum radii of the ports through which the combustion air flows, nevertheless requires an overall volume that is rarely available in the application shown, which is an internal combustion engine with V-shaped cylinder arrangement. The air intake device is further characterized by a considerable overall height so that, even if the air intake device can be installed in the internal combustion engine, its total height is difficult to accommodate in the engine compartment of a vehicle.

SUMMARY OF THE INVENTION

Thus, it is the object of the invention to provide an air intake system with intake ducts and longitudinally adjustable resonance channels, which can be optimally adapted to the geometric boundary conditions of the available installation space.

This and other objects are achieved in accordance with the present invention by the apparatus described and claimed hereinafter.

The air intake device according to the invention has longitudinally adjustable resonance channels that extend helically around at least one resonance manifold. The resonance channels can also wind around two different resonance manifolds, in which case the resonance manifolds must communicate with one another via a line in order to ensure the effect of resonance charging. A manifold in the sense of the invention is defined as an acoustically effective volume. Thus, to be exact, the acoustically effective connection between the two resonance manifolds also forms part of the volume that produces the resonance effects. The length of the resonance channels is determined by rotating one or more control elements that are either combined in a control housing or are accommodated in different control housings. The control element contains the resonance manifold in its central area so that the connection opening between resonance manifold and resonance channels can be shifted by rotating the control element. As a result, the effective length of the resonance channels is variable.

The intake ducts can be assigned to two groups and accordingly lead to outlets in at least one cylinder head flange. It is conceivable to provide an intake manifold for an internal combustion engine with inline cylinder arrangement. Here, the two groups of cylinders converge in one cylinder head flange. The intake manifold, however, can also be conceived for an internal combustion engine with a V-type cylinder arrangement, in which the groups of intake ducts with the associated outlets are each provided for a respective cylinder bank. In principle, it is feasible to divide the intake ducts into three different groups, for example, for a combustion engine with a W-type cylinder arrangement.

At least one resonance channel must be provided per ram manifold. It is also possible, however, to arrange a plurality of resonance channels, so that the necessary cross-sectional area for the resonance channels can be better adapted to the geometric boundary conditions of the air intake device. Closing off a portion of the resonance channels makes it possible to reduce the total cross-sectional area of the resonance channels. The resonance valve between the ram manifolds can be arranged in a duct that interconnects the different ram manifolds. Another option is to arrange the resonance flaps in a partition between the ram manifolds. This makes it possible to achieve a higher level of integration of the individual volumes in a housing structure. The control housings, too, can be integrated in the housing structure of the air intake device.

The invention is characterized by a connecting duct that extends between the resonance channels and the ram manifolds and contributes to bridging a spatial distance resulting between the ram manifolds and the substantially cylindrical volume of the control housing. This obviates the necessity for a complex integration of the individual components into a housing structure of the air intake device as described in DE 39 40 486. The connecting ducts provide grater design latitude in the arrangement of the control housing. As a result, the geometry of the intake manifold can be optimally adapted to the planned overall volume. The connecting ducts extend the longitudinally adjustable resonance channels and consequently have a resonance effect. In the design of the air intake device, attention must therefore be paid to the required longitudinal ratios and the required control range through the adjustment of the length. Within these boundary conditions, the geometry of the connecting ducts can be freely designed.

According to an advantageous embodiment of the invention, a plurality of resonance channels is integrated into a single housing. This reduces the component cost for the resonance channel adjustment and results in a compact control housing. In the most favorable case, two resonance channels are provided for the air intake device, which are arranged side by side in a drum-shaped control housing. The air intake is located, for example, in the axis of rotation for the control elements, and the connecting ducts are tangentially adjacent to the outer circumference of the control housing. Through a corresponding curvature of the connecting ducts, the air can also be redirected within the resonance channels and guided to the corresponding inlets in the ram manifolds.

According to a further embodiment of the invention, the resonance channels are arranged offset around the resonance manifold. As a result the connecting ducts can have different lengths, so that the overall length of the resonance channels is equal, irrespective of the position of the control elements. This further enhances the design freedom in the arrangement of the control housing within the air intake device.

In accordance with a further embodiment of the invention, a plurality of resonance channels is combined in one control element. This makes it possible further to reduce the component cost, so that the assembly can be produced more economically.

It is advantageous if the connecting ducts are combined in a multi-chamber profile. This multi-chamber profile forms a separate cross section for each of the connecting ducts. The fact that certain wall portions can be used by each of the connecting ducts makes it possible to save material overall. Furthermore, if the multi-chamber manifold is connected with other housing structures of the air intake device, the assembly costs may be reduced.

In accordance with a further embodiment of the invention, the control housing is configured separately from an intake manifold housing. The two housings together create the air intake device, and the intake manifold housing comprises at least the ram manifolds and the intake ducts. The connection between intake manifold housing and control housing is ensured at least by the connecting ducts. In addition, other assembly devices may be provided, which result in a more rigid connection and facilitate assembly. If the control housing is designed separately, it can advantageously be used as a module that is suitable for mounting to different intake manifolds. Thus, the control housing can be adapted to different intake manifolds, so that the cost of a new design is limited to the intake manifold housing. This makes it possible to develop design series and equip different engine types with intake manifolds that are provided as a function of the equipment, with or without resonance charging.

According to a further embodiment of the invention, the connecting ducts of the control housing can be designed at least in part as adapter elements to permit adaptation to different intake manifolds. This allows for a geometric adaptation to different intake manifold housings by using different adapter elements.

A particularly simple option is to mount the control housing to the throttle connection of the intake manifold housing. The throttle is then no longer mounted to the intake manifold housing but to the combustion air intake on the control housing. This also makes it possible to retrofit resonance charging to existing intake manifold concepts, which provide for aggregation of a modular throttle on the inlet connection of the intake manifold.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
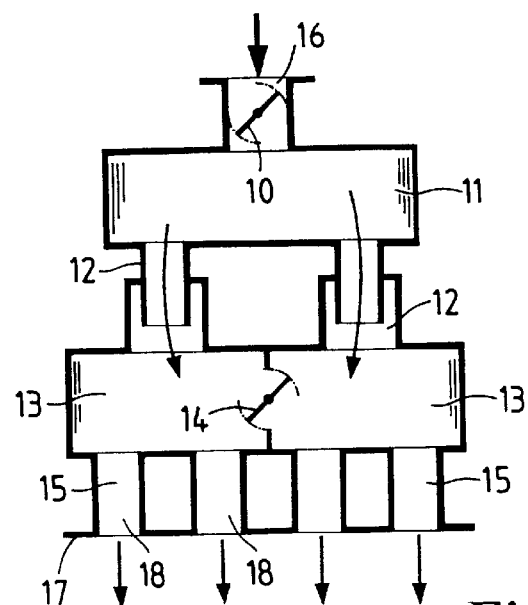
FIG. 1 schematically illustrates the mode of operation of an intake manifold with resonance and ram charging.

FIG. 1 illustrates the initially described principle of an air intake device with combined ram and resonance charging. The flow of the intake air is indicated by arrows. The intake air passes through a throttle 10 and flows into a resonance manifold 11. From there it passes through longitudinally adjustable resonance channels 12 into two ram manifolds 13 that are connected by a resonance flap valve 14. Intake ducts 15 emanating from the ram manifolds are divided into two groups corresponding to the ram manifolds. The throttle connection forms an inlet 16, and a cylinder head flange 17 forms the outlets 18 of the intake ducts to the cylinder head.

Figure 2:
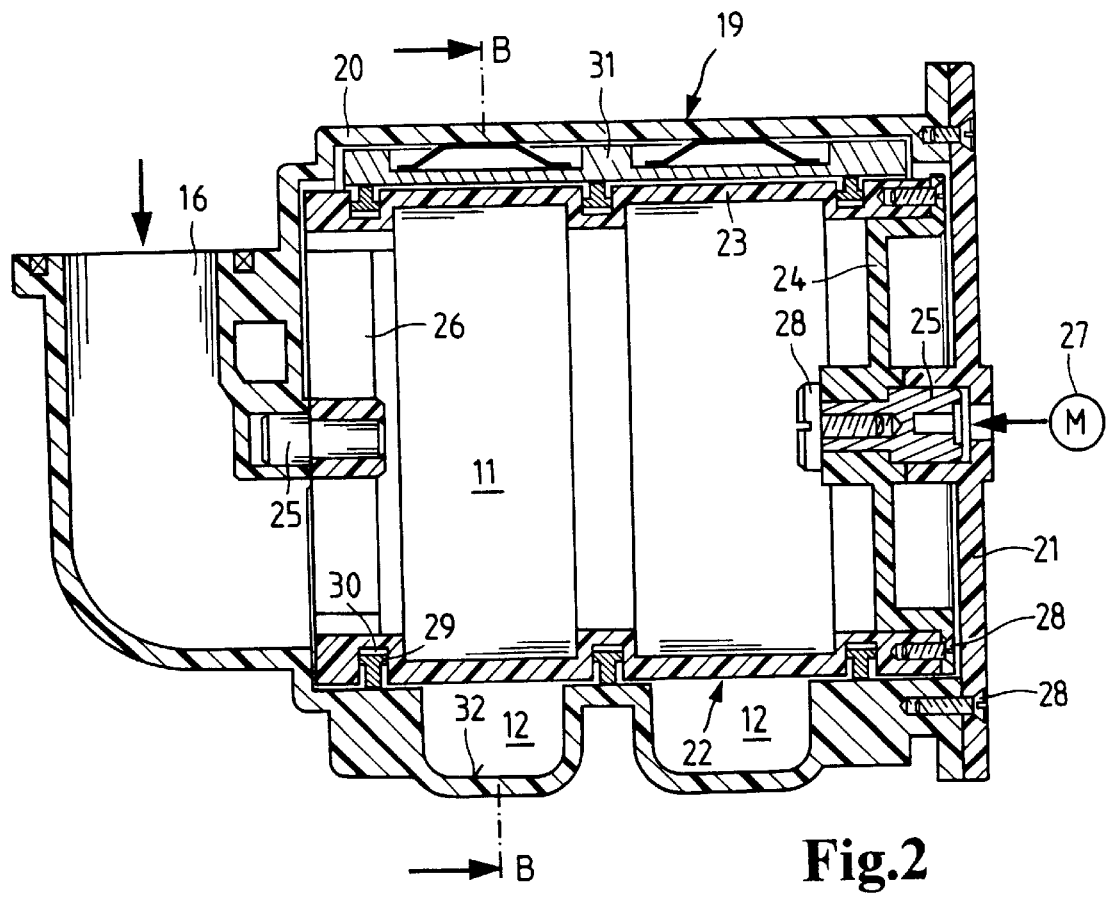
FIG. 2 is a longitudinal sectional view of an illustrative embodiment of a control housing.

FIG. 2 shows a control housing 19 suitable for use with in an air intake device according to FIG. 1. This control housing comprises a substantially cylindrical control body housing 20, which is sealed with a cover 21. The two resonance channels 12 are co-formed by a control element 22 consisting of a cylinder shell 23 and a bearing cover 24. The control element 22 is supported in control housing 19 via bearing pins 25. Opposite the bearing cover 24, radial ribs 26 ensure the supply of intake air through inlet 16 irrespective of the angular position of the control elements 22. The control cylinder is adjusted by a drive 27. The components of the resonance channel adjustment are assembled via screws 28. The movable components are sealed in relation to the housing components via sealing rings 29, which are radially supported within the housing. These sealing rings are inserted in grooves 30 in the control element 22. Further, a seal 31 is provided, which seals the start of the resonance channels 12 in relation to the outlets to the ram manifolds (cf. FIG. 3). The resonance channels 12 are formed on the one hand by the outside surfaces of the control element 22 and on the other hand by an inner contour 32 of the control housing. They extend around the control element.

Figure 3:
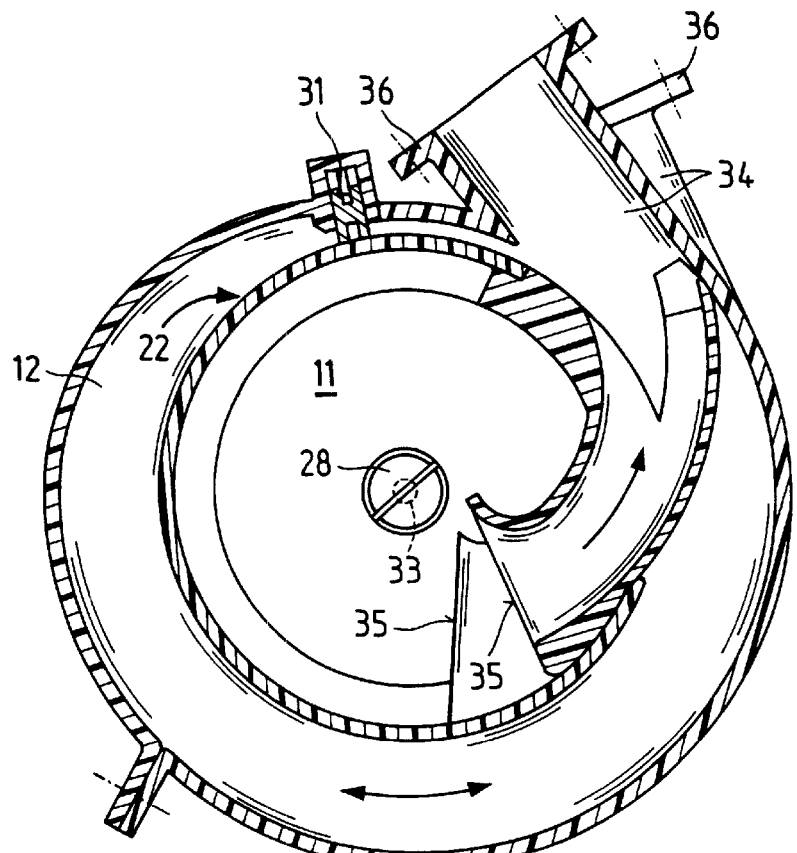
FIG. 3 is a section along line B—B in FIG. 2.

FIG. 3 shows the centrally symmetrical course of the resonance channels 12 around a central axis 33. Tangentially adjacent to the adjustable resonance channels are two connecting ducts 34, which are arranged offset with respect to the intake openings 35 integrated in the control element 22. This makes it possible to mount mounting flanges 36 located on the connecting ducts 34 in different connection areas of an intake manifold housing (not shown).

Figure 4:
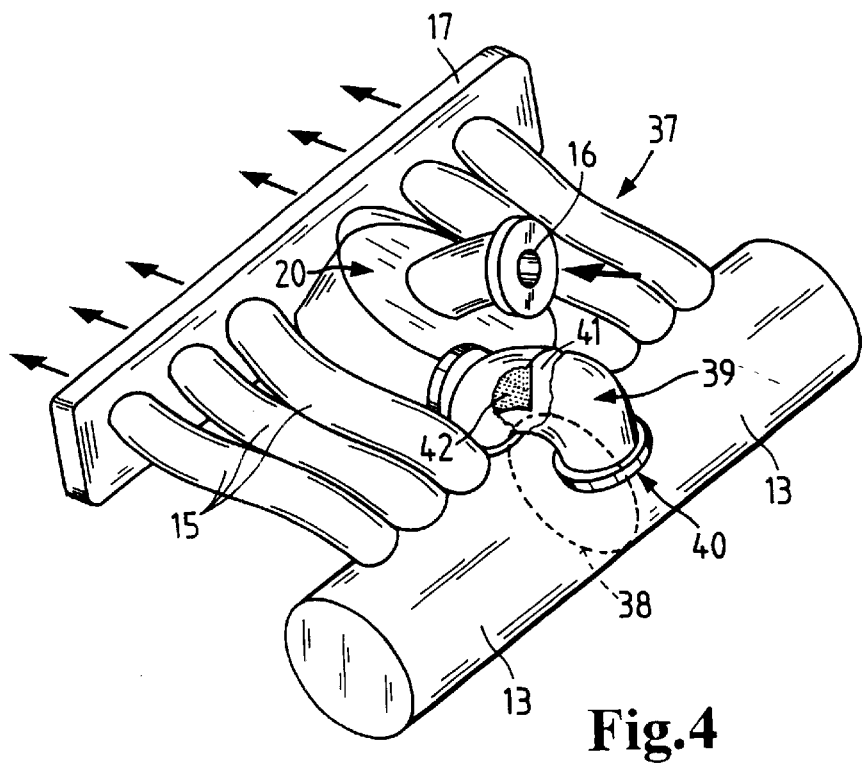
FIG. 4 is a perspective view of an air intake device for an inline six-cylinder engine comprising an intake manifold housing, a control housing and an adapter element.

FIG. 4 shows an air intake device comprising an intake manifold housing 37 containing intake ducts 15, two ram manifolds 13 separated by a partition 38 with a resonance valve, a cylinder head flange 17, and a separately constructed control housing. These two housing parts are interconnected by an adapter element 39, which serves as a connecting duct. The control housing 20 is accommodated between the intake ducts 15 to save space.

The control housing 20 further has an inlet 16, which is designed as a flange for a throttle. The adapter element 39 is connected with a throttle connection 40, which is mounted above partition 38 to the two ram manifolds 13 and which in one variant of the intake manifold housing 37 without resonance channel adjustment serves to connect the throttle, which in the case depicted is mounted to inlet 16.

The adapter element 39 has a duct structure 41, which is characterized by a partition wall 42 that communicates with the partition 38 between the ram manifolds 13. This causes a cross section with two chambers to be formed in the adapter element, so that both connecting ducts for the resonance channels in the control housing 20 can be formed by the one duct structure 41. The partition wall 42 may be seen in the cut-away portion of the adapter element.

Figure 5:
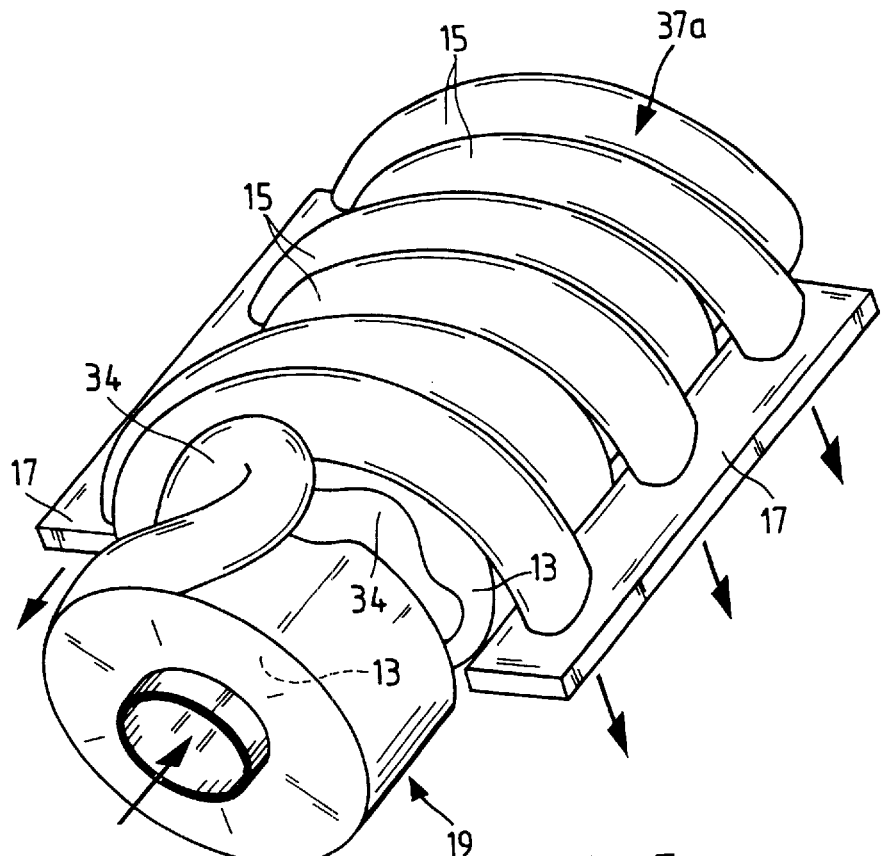
FIG. 5 is a perspective view of an intake manifold for a six-cylinder internal combustion engine with V-type cylinder arrangement.

FIG. 5 shows an intake manifold housing 37a for an internal combustion engine with a V-type cylinder arrangement. This figure shows the intake ducts 15 opening out into two cylinder head flanges 17 and arranged extending around the two ram manifolds 13, which extend parallel to each other. The control housing 19, which forms a single part together with the intake manifold housing 37a, is connected upstream from the inlets to the ram manifolds. The two connection ports 34 extend independently from one another and open out into the two ram manifolds 13.

Figure 6:
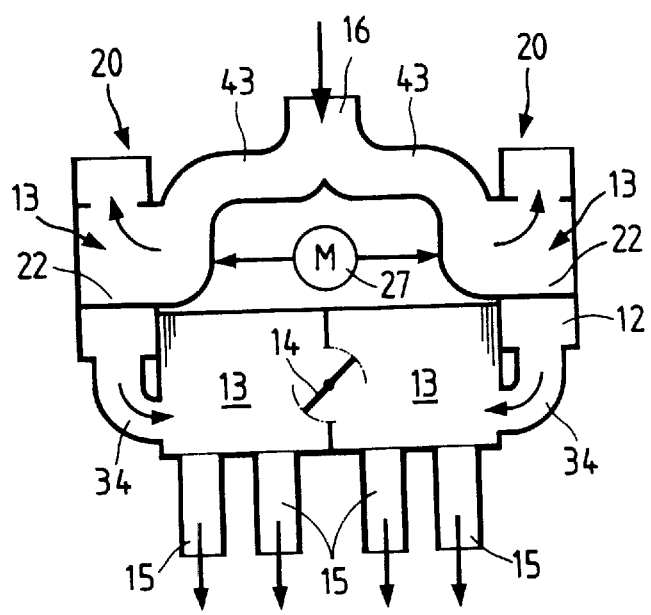
FIG. 6 is a schematic representation of an air intake device in which the resonance channels are accommodated in two control housings.

FIG. 6 schematically depicts an alternative embodiment of the air intake device in which two control elements 22 are arranged in independent control housings 20. An intake line 43 starting from inlet 16 is thus divided between the two control housings 20. Drive 27 is mechanically coupled with both control elements 22 to enable synchronous adjustment of these functional groups. To reach the cylinders, the intake air flows through the resonance channels 12, the connecting ducts 34, the ram manifold 13, and the intake ducts 15.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake device comprising:
   an inlet connected with at least one resonance manifold,
   a plurality of longitudinally adjustable resonance channels leading from the at least one resonance manifold to two ram manifolds, wherein the resonance channels extend around the at least one resonance manifold and their length can be adjusted by rotating at least one control element containing the resonance manifold and located in at least one control housing;
   intake ducts leading from the ram manifolds to respective groups of outlets assigned to at least one cylinder head flange for connection to an associated connecting system; and
   a resonance valve through which the ram manifolds can be connected and disconnected;
   wherein connecting ducts are arranged between the longitudinally adjustable portions of the resonance channels and the ram manifolds to bridge a spatial distance between the cylindrical volume defined by the at least one control housing and the ram manifolds.

2. An air intake device as claimed in claim 1, wherein a plurality of resonance channels are integrated in a single control housing.

3. An air intake device as claimed in claim 2, wherein the resonance channels are arranged with angular positions offset from one another relative to a central axis of the resonance manifold.

4. An air intake device as claimed in claim 1, wherein a plurality of resonance channels is combined in a single control element.

5. An air intake device as claimed in claim 1, wherein a plurality of connecting ducts is combined into a multi-chamber profile structure having a cross section which comprises a separate chamber for each connecting duct.

6. An air intake device as claimed in claim 1, wherein the control housing is constructed separately from an intake manifold housing containing at least the ram manifolds and the intake ducts, and wherein the control housing and the intake manifold housing are connected at least by the connecting ducts.

7. An air intake device as claimed in claim 1, wherein said air intake device is an intake manifold for an internal combustion engine, and wherein the at least one cylinder head flange is connected to at least one cylinder head of the internal combustion engine.

8. A control housing for an air intake device as claimed in claim 1, wherein said control housing is designed as a module, which is suitable for mounting to different intake manifolds.

9. A control housing as claimed in claim 8, wherein the connecting ducts are at least partially designed as adapter elements, which are connected between the intake manifold housing and a housing body of the control housing.

10. A control housing as claimed in claim 8, wherein said control housing has a flange at the end of the connecting ducts, which can be mounted to a throttle connection of the intake manifold housing.

* * * * *